US006044712A

United States Patent [19]

Cannet et al.

[11] Patent Number: 6,044,712

[45] Date of Patent: Apr. 4, 2000

[54] BOURDON-TUBE PRESSURE GAUGE

[75] Inventors: Gilles Cannet, Parmain; Stephane Thouvier, Sannois; Jean-Christophe Charbonnel, Cergy, all of France

[73] Assignee: L'Air Liquide, Societe Anonyme pour l'Etude et l'Exploitation des Procedes George Claude, Paris Cedex, France

[21] Appl. No.: 09/077,101

[22] PCT Filed: Nov. 15, 1996

[86] PCT No.: PCT/FR96/01805

§ 371 Date: May 20, 1998

§ 102(e) Date: May 20, 1998

[87] PCT Pub. No.: WO97/19333

PCT Pub. Date: May 29, 1997

[30] Foreign Application Priority Data

Nov. 23, 1995 [FR] France .................................. 95/13941

[51] Int. Cl.[7] .................................................. G01L 7/04

[52] U.S. Cl. .................................................. 73/741

[58] Field of Search ............................ 73/741, 732, 733, 73/740, 743

[56] References Cited

U.S. PATENT DOCUMENTS

| | | | |
|---|---|---|---|
| 1,169,982 | 2/1916 | Manning | 73/741 |
| 1,414,121 | 4/1922 | Gabel | 73/741 |
| 1,539,101 | 5/1925 | Adams | 73/741 |
| 1,632,749 | 6/1927 | Shaw | 73/741 |
| 2,052,409 | 8/1936 | Kollsman | 73/741 |
| 4,108,007 | 8/1978 | Neubeck et al. | 73/732 |

*Primary Examiner*—William Oen
*Attorney, Agent, or Firm*—Young & Thompson

[57] ABSTRACT

A pressure gauge comprising a body (14) and a pressure sensing member consisting of a resiliently flexible curved tube (12) attached to the body (14) and having a fixed end (16) for communication with a fluid to enable pressure measurement, and a closed opposite end (18) freely movable by the fluid pressure relative to the body (14) and controlling a pressure indicator (20). The gauge comprises at least one stop (36) arranged between the body (14) and the tube (12) for restricting the resiliency of the tube (12).

10 Claims, 3 Drawing Sheets

BOURDON-TUBE PRESSURE GAUGE

CROSS REFERENCE TO RELATED APPLICATION

This is the 35 USC 371 National Stage of International application PCT/FR96/01805 filed on Nov. 15, 1996, which designated the United States of America.

FIELD OF THE INVENTION

The present invention relates to a pressure gauge of the type with a Bourdon tube.

BACKGROUND OF THE INVENTION

Pressure gauges of this type generally include a body, a pressure sensor member consisting of an elastically deformable bent tube which is fixed to the said body and has a fixed end for communicating with a fluid with a view to measuring its pressure and a closed opposite end which is free to move relative to the said body under the effect of the pressure of the fluid and controls a pressure indicator.

These pressure gauges have very high precision but include particularly fragile parts, for example the mechanism connecting the Bourdon tube to the needle, the needle and the Bourdon tube.

In order to prevent the pressure gauges from being destroyed when they are subjected to direct impacts, that is to say impacts which are directly applied to them, it is known to equip their casing with an elastomer liner in order to absorb the impacts. Other pressure gauges are equipped with a metal grill forming a cage around the casing.

Protectors of this type give effective protection against direct impacts.

However, protectors of this type are not effective against accelerations in excess of 400 g, for example due to dropping a bottle on which the pressure gauges are fitted.

Indeed, under the effect of its own weight and the weight of the parts which are fixed to it, the Bourdon tube will in this case tend to deform beyond its elastic limit, which causes damage to the pressure gauge.

Furthermore, when it deforms, the tube may crush the needle control mechanism, which makes the pressure gauge unusable.

SUMMARY OF THE INVENTION

The object of the invention is to overcome these drawbacks and to provide a pressure gauge which can withstand indirect impacts, that is to say ones where the point of impact does not lie on the pressure gauge itself.

The invention therefore relates to a pressure gauge of the aforementioned type, characterized in that it includes at least one stop which is intended to limit the deformation of the tube and is interposed between the body and the tube.

The invention may furthermore include one or more of the following characteristics:

- the stop includes a part for fastening on the body, extended in the direction of the tube by an active part which is in the form of a circle arc and is arranged facing a region of the tube intermediate between the fixed and free ends;
- the active part in the form of a circle arc has a convex active surface with convexity turned towards the tube and a radius of curvature substantially equal to that of the tube, and on which the radially inward surface of the tube abuts;
- the active part in the form of a circle are is extended outwards by at least one partially annular lip for limiting the movement of the tube in a direction perpendicular to the plane defined by the bent tube;
- the active part in the form of a circle arc furthermore has a concave active surface, coaxial with the convex active surface, with convexity turned towards the tube and the radius of curvature substantially equal to that of the tube, the concave active surface extending radially outwards relative to the convex active surface in order to limit the movement of the tube in a radially outward direction;
- the fastening part has c, cutout defining a housing provided with means for fastening on the body;
- the stop has a finger which is fixed relative to the body and extends in the direction of the closed free end of the tube and on which this end abuts;
- the stop extends substantially in extension of the closed free end of the tube;
- the pressure indicator has a needle mounted so that it can move angularly relative to a graduated dial, and the said finger has a screwthread co-operating with a complementary tap made in the body or in the remaining part of the stop and constitutes a member for adjusting the position at rest of the needle facing the origin of the graduation;
- the bent tube having a coiled shape, the stop has a part for fastening on the body which is extended in the direction of the tube by a cylindrical active part coaxial with the bent tube;
- the stop is made of a rigid material;
- at least the active part of the stop is made of an elastically deformable material.

BRIEF DESCRIPTION OF THE DRAWINGS

Other characteristics and advantages will emerge from the following description, given solely by way of example and without implying any limitation, and with reference to the appended drawings, in which.

DETAILED DESCRIPTION OF THE INVENTION

Figure 1:
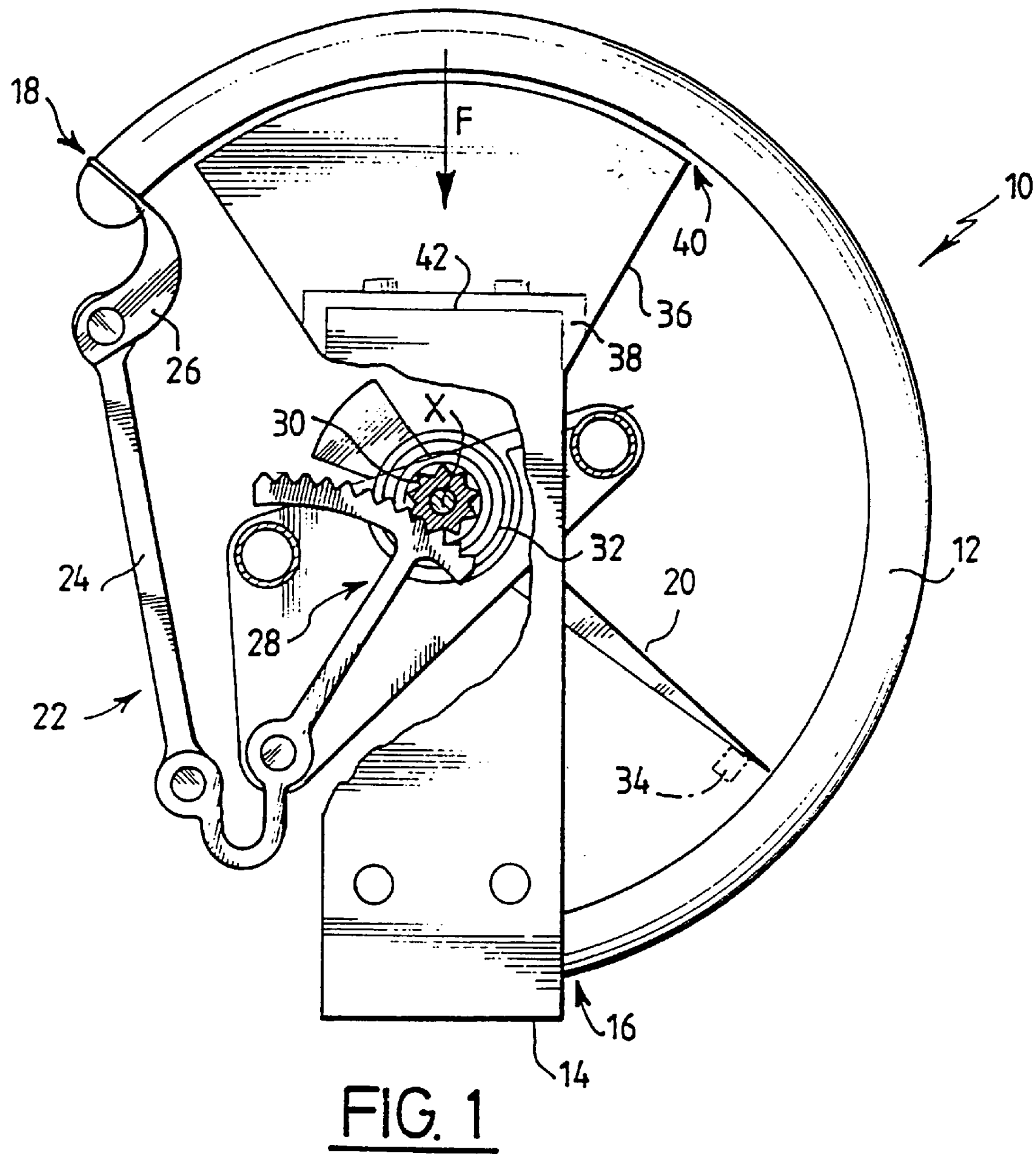
FIG. 1 represents a schematic bottom view of a first embodiment of a pressure gauge according to the invention.

FIG. 1 represents a pressure gauge of the type with a Bourdon tube, denoted by the numerical reference 10, when it is in the vertical position and at rest.

This pressure gauge 10 has an elastically deformable metal tube 12 fixed on a body 14 (not to scale) which will be fastened on a pressurized fluid bottle (not shown) or any other instrument or pipeline containing a fluid under pressure.

The tube 12, also referred to as a Bourdon tube, has a first end 16 which is fixed on the body 14 and is intended to be placed in communication with a fluid with a view to measuring its pressure, and a closed opposite end 18 which is free to move relative to the body 14 under the effect of the pressure exerted by the fluid.

The free end 18 is connected to a drive mechanism of a pressure indicator consisting of a needle 20 which can move angularly about an axis of rotation X perpendicular to the plane of FIG. 1.

The drive mechanism, denoted by the numerical reference 22, has a connecting rod 24 which is articulated, on the one hand, to a fastener 26 connected to the free end 18 of the tube 12 and, on the other hand, to a rack 28 controlling the rotation of a pinion 30 which defines the axis of rotation X and is secured to the needle 20.

The pressure gauge 10 furthermore includes an elastic return member consisting of a coiled spring 32 which connects the needle 20 to the body 14 and pushes the needle into the resting position (FIG. 1) in which it bears on a needle stop 34, represented by a dot and dash line.

This FIG. 1 shows that the pressure gauge furthermore includes a stop 36 interposed between the body 14 and the Bourdon tube 12.

The stop 36 includes a part 38 for fastening on the body 14, extending outwards in the direction of the tube 12 by an active part 40 which is in the form of a circle arc and is arranged facing a region of the tube 12 intermediate between the fixed 16 and free 18 ends.

The part 40 in the form of a circle arc defines a convex active surface, with convexity turned towards the tube 12, the radius of curvature of which is substantially equal to that of the tube 12.

The fastening part 38 of the stop 36 includes a cutout 42 defining a housing for accommodating the body 14 on which the stop 36 is fixed.

The stop 36 is advantageously fixed on the body 14 by screwing.

As mentioned above, the pressure gauge which has just been described is intended to be fitted to a bottle of fluid with a view to measuring its pressure.

When it is subjected to an indirect impact, that is to say an impact applied to the bottle, for example if this bottle is dropped, an acceleration is transmitted to the pressure gauge, and by inertia this causes the Bourdon tube 12 to deform in a direction opposite to that of the force applied to the bottle.

In order to limit the movement of the tube 12, the stop 36 is placed on the path of the tube, so as to limit the deformation to an elastic deformation.

It will be understood that the most frequent impacts are applied to the bottom of the bottle. Impacts of this type cause the Bourdon tube 12 to move in a direction which is radially inward, when considering the way in which the tube is bent, and directed vertically downwards, that is to say in the direction denoted by the arrow F in FIG. 1. This movement therefore takes place in the opposite direction to the normal working direction of the tube, when considered starting from the rest position.

In the example which is represented, the stop 36 is located on the path of the tube 12 when subjected to a force exerted on the bottom of the bottle, but the stop 36 may of course be arranged in front of any region of the tube 12 intermediate between the fixed 16 and free 18 ends.

Thus, according to an embodiment which has not been shown, it is conceivable to give the pressure gauge a stop provided with an active part delimiting a convex surface substantially equal to the radially inward surface of the tube. This embodiment makes it possible to protect the pressure gauge against all types of impact which cause the tube to move in a direction opposite to its normal working direction.

It will be understood that the stop 36 makes it possible to limit the movement of the Bourdon tube 12 due to impacts applied to the bottle equipped with the pressure gauge. This stop makes it possible, on the one hand, to limit the movements of the tube 12 to elastic deformations and, on the other hand, to limit the forces applied by the needle stop 34 to the needle 20, and therefore to limit the deformations of this needle.

Advantageously, the stop 36 is made of a rigid material, for example brass. It is, however, envisageable to use a stop made of an elastically deformable material such as nylon. In this case, the body 14 and the stop 36 can be provided with snap-fastening means.

Other embodiments of the stop will now be described with reference to FIGS. 2 to 6.

Figure 2:
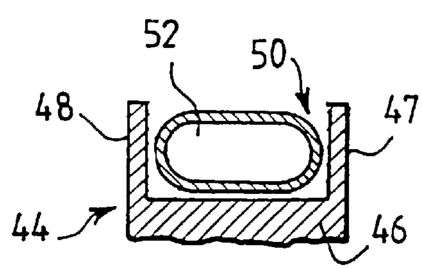
FIG. 2 is a sectional schematic view illustrating another embodiment of the active region of the stop of the pressure gauge in FIG. 1.

It can be seen in FIG. 2, in which the radially outward region of a stop 44 has been schematically represented in section, that according to a second embodiment the active part 46, in the form of a circle arc, is extended outwards by two partially annular lips 47 and 48 defining a groove 50 for accommodating the Bourdon tube 52.

This embodiment makes it possible to limit the movements of the tube 52, on the one hand, in a direction opposite to the normal working direction of the tube, as in the illustrative embodiment in FIG. 1, and, on the other hand, in a direction perpendicular to the plane defined by the Bourdon tube 52, that is to say perpendicular to the normal working direction of tube.

Figure 3:
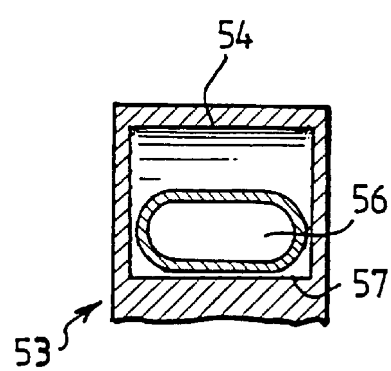
FIG. 3 illustrates a third embodiment of the active region of the stop.

According to a third embodiment, represented in FIG. 3, the active part, in the form of a circle arc, of the stop 53 furthermore has a concave active surface 54, with concavity turned towards the tube 56 and a radius of curvature substantially equal to that of the tube. This concave surface 54 extends radially outwards relative to the convex active surface 57 and is concentric with it. It constitutes an abutment surface for the radially outward surface of the Bourdon tube 56, and thus limits the movement of the tube in a radially outward direction, that is to say in the normal working direction of the tube.

In this case, it will be understood that the concave active surface 54 is separated from the Bourdon tube 56 by a sufficient distance to allow it to fulfil its function, and to intervene when the normal working range of the tube is exceeded, limiting those deformations experienced in the event of indirect impacts to elastic deformations.

It should be noted that, in the embodiments described above, the stop is not in contact with the tube so long as the pressure guage is not knocked. It does not therefore interfere with the operation of the pressure gauge in the absence of impact. The clearance between the tube and stop allows wider manufacturing tolerances and therefore reduced cost. It furthermore makes it possible to use the stop for pressure gauges of the type involved in depressurization, for which the deformation of the tube, in comparison with positive pressures, takes place in the opposite direction, towards the stop.

It is, of course, also possible to give the pressure gauge a stop in contact with the tube.

Figure 4:
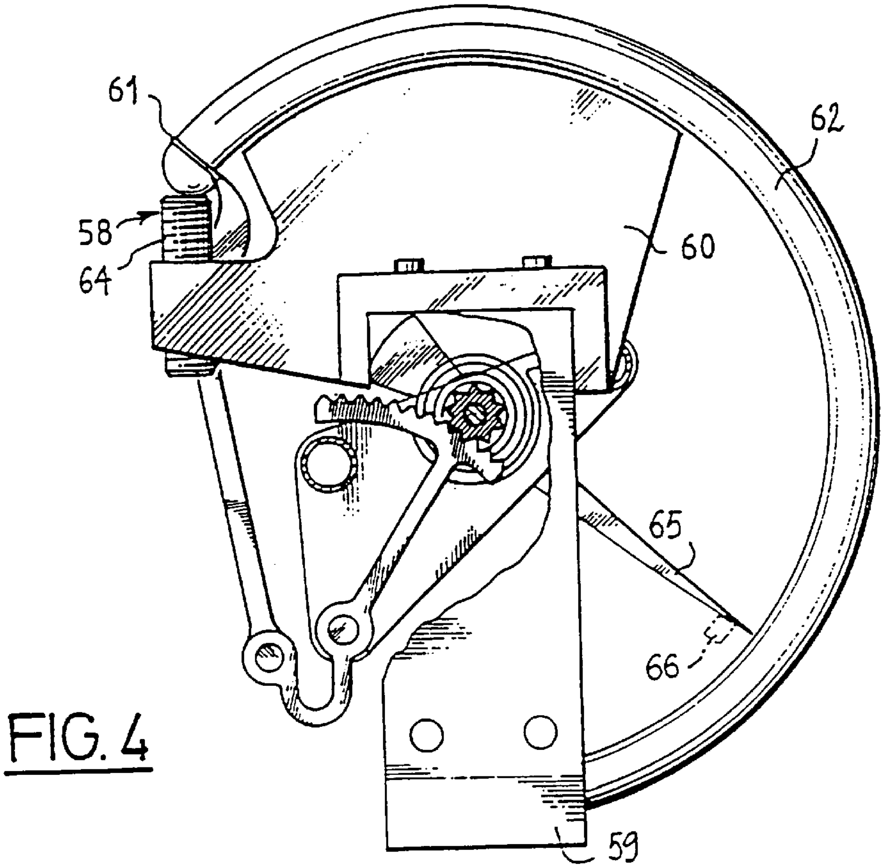
FIG. 4 represents another embodiment of the pressure gauge according to the invention.
Figure 5:
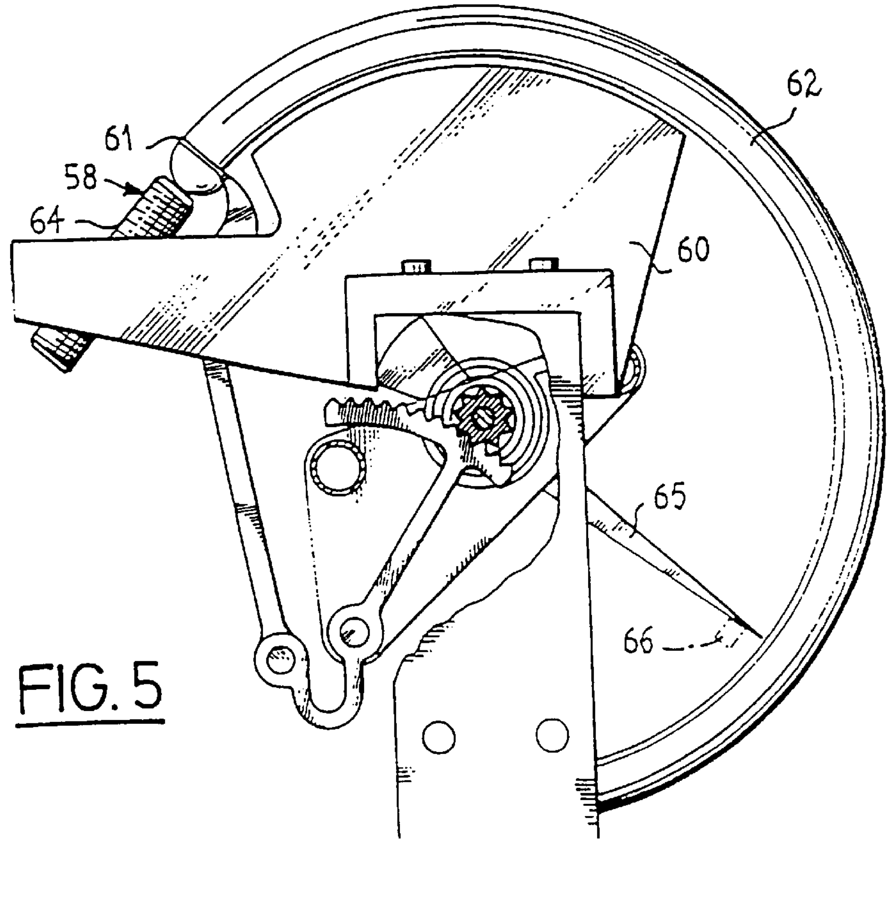
FIG. 5 represents another embodiment of the pressure gauge according to the invention.

Referring to FIGS. 4 and 5, which show a pressure gauge similar to the ones in FIG. 1, the pressure gauge has a finger 58 which is fixed relative to the body 59 on which a stop 60 is fixed, as defined above, and extends in the direction of the closed free end 61 of the tube 62 and on which this end 61 abuts.

The longitudinal axis of the finger 58 is preferably oriented parallel to the direction of the most frequent forces, as mentioned above with reference to FIG. 1, but may as a variant lie in extension of the closed free end of the tube (FIG. 5).

The finger 58 is provided with a screwthread 64 which engages with a complementary tap (not shown in FIGS. 4 and 5) made in the stop 60.

This finger 58 constitutes a complementary stop, making it possible to limit the movement of the corresponding end region 61 of the tube 62. It may also be used in the absence of the stop 60. In this case, it is directly fixed on the body 59.

It will be understood that this finger 58 also makes it possible, through adjusting its axial position by screwing or unscrewing, to limit the pressure exerted by the needle 65 on its needle stop 66.

It makes it possible, as a variant and in the absence of the needle stop, to adjust the resting position of the needle in front of the origin of the graduation of the dial of the pressure gauge (not shown).

Figure 6:
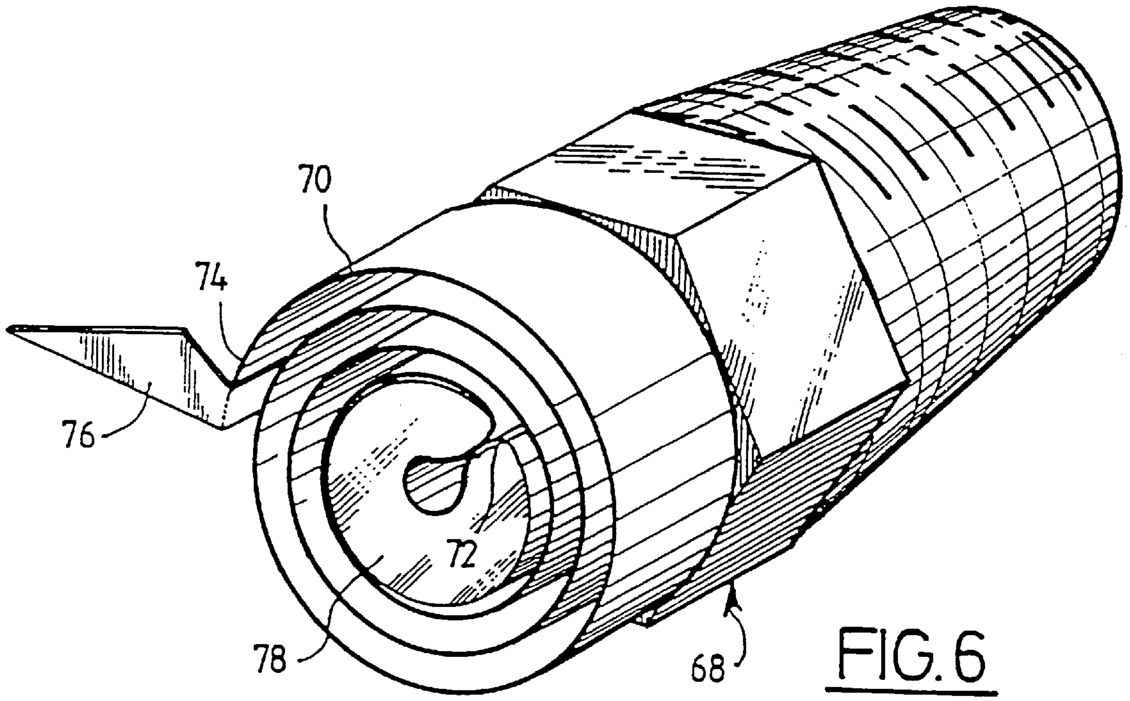
FIG. 6 represents another embodiment of a stop for a pressure gauge with a coiled Bourdon tube.

A fifth embodiment of the stop according to the invention will now be described with reference to FIG. 6.

The pressure gauge represented in this figure has a body 68 which is intended to be fixed on a pressurized fluid bottle (not shown) and to which a coiled Bourdon tube 70 is fixed.

As in the previous illustrative embodiments, the tube 70 has a fixed end 72, secured to the body 68, and a closed opposite end 74 which is free to move relative to the body 68 and to which a needle 76 is fixed.

This pressure gauge has a stop 78 of generally cylindrical shape, coaxial with the coiled tube 70 and provided with a first end fixed to the body 68, the other end defining an active surface on which the radially inward surface of the Bourdon tube 70 will abut in the event of impact.

This type of pressure gauge therefore makes it possible to withstand impacts directed in a direction opposite to or coinciding with the normal working direction of the tube 70.

It will be understood that, in the various embodiments which have been described, the pressure gauges have particularly high resistance to impacts, even for impacts generating accelerations in excess of 400 g.

The invention is not limited to the embodiments which have been described.

Thus, the body and the stop of the pressure gauge may be made in a single piece consisting of a rigid material and, if appropriate, including an elastically deformable flexible part lining the active surfaces of the stop.

What is claimed is:

1. Pressure gauge comprising a body, a pressure sensor member consisting of an elastically deformable bent tube which is fixed to said body and has a fixed end for communicating with a fluid with a view to measuring its pressure and a closed opposite end which is free to move relative to said body under the effect of the pressure of the fluid and controls a pressure indicator, at least one stop intended to limit the deformation of the tube and being connected to the body, the stop including a fastening part for fastening on the body, extended in the direction of the tube by an active part which is in the form of a circle arc and is arranged facing an intermediate region of the tube fixed and free ends, said active part in the form of a circle being made of an elastically deformable material and having a convex active surface with convexity turned towards the tube and a radius of curvature substantially equal to that of the tube, and on which the radially inward surface of the tube abuts.

2. Pressure gauge according to claim 1, wherein the active part in the form of a circle arc is extended outwards by at least one partially annular lip for limiting the movement of the tube in a direction perpendicular to the plane defined by said bent tube.

3. Pressure gauge according to claim 1, wherein the active part in the form of a circle arc furthermore has a concave active surface, coaxial with the convex active surface, with concavity turned towards the tube and the radius of curvature substantially equal to that of the tube, said concave active surface extending radially outwards relative to said convex active surface in order to limit the movement of the tube in a radially outward direction.

4. Pressure gauge according to claim 1, wherein the fastening part has a cutout defining a housing provided with means for fastening on the said body.

5. Pressure gauge according to claim 1, wherein the stop has a finger which is fixed relative to the body and extends in the direction of the closed free end of the tube and on which this end abuts.

6. Pressure gauge according to claim 5, wherein the stop extends substantially in the extension of the closed free end of the tube.

7. Pressure gauge according to claim 5, wherein the pressure indicator has a needle mounted so that it can move angularly relative to a graduates dial, and the finger has a screwthread co-operating with a complementary tap made in the body or in the remaining part of the stop and constitutes a member for adjusting the position at rest of the needle facing the origin of the graduation.

8. Pressure gauge according to claim 1, wherein the deformable material is nylon.

9. Pressure gauge comprising a body, a pressure sensor member consisting of an elastically deformable bent tube having a coiled shape, said tube being fixed to said body and having a fixed end for communicating with a fluid with a view to measuring its pressure and a closed opposite end which is free to move relative to said body under the effect of the pressure of the fluid and controls a pressure indicator, at least one stop intended to limit the deformation of the tube and being connected to the body, the stop including a part for fastening on the body, which is extended in the direction of the tube by a cylindrical active part coaxial with the bent tube.

10. Pressure gauge according to claim 9, wherein the stop is made of brass.

* * * * *